(12) United States Patent
Ito

(10) Patent No.: US 7,868,069 B2
(45) Date of Patent: *Jan. 11, 2011

(54) DISPERSED COMPOSITION AND PROCESS FOR PRODUCING SHAPED ARTICLE USING THE SAME

(75) Inventor: Hisayoshi Ito, Himeji (JP)

(73) Assignee: Daicel Chemical Industries, Ltd., Sakai-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/379,232

(22) Filed: Feb. 17, 2009

(65) Prior Publication Data

US 2009/0170981 A1    Jul. 2, 2009

Related U.S. Application Data

(62) Division of application No. 10/515,420, filed as application No. PCT/JP03/06171 on May 16, 2003, now abandoned.

(30) Foreign Application Priority Data

May 29, 2002 (JP) ............................. 2002-156112
Jan. 31, 2003 (JP) ............................. 2003-023536

(51) Int. Cl.
*C08L 5/00* (2006.01)
*C08L 89/00* (2006.01)

(52) U.S. Cl. .............................. 524/56; 524/27; 524/47; 524/58

(58) Field of Classification Search ................... 524/27, 524/56, 58
See application file for complete search history.

(56) References Cited

U.S. PATENT DOCUMENTS 4,370,286 A    1/1983  Nehmey et al.
5,290,832 A    3/1994  Schwerzel et al.
6,303,587 B1  10/2001  Yvin et al.
6,426,375 B1   7/2002  Kubota et al.
7,442,730 B2  10/2008  Ito

FOREIGN PATENT DOCUMENTS

| CA | 2395427 | | 6/2001 |
|---|---|---|---|
| CN | 1254254 | A | 5/2000 |
| EP | 1-247840 | A1 | 10/2002 |
| JP | 58-59233 | A | 4/1983 |
| JP | 60-13816 | A | 1/1985 |
| JP | 61-9433 | A | 1/1986 |
| JP | 9-48876 | A | 2/1997 |
| JP | 9-165457 | A | 6/1997 |
| JP | 9-324117 | A | 12/1997 |
| JP | 10-176065 | A | 6/1998 |
| JP | 2001-2825 | A | 1/2001 |
| JP | 2003-20356 | A | 1/2003 |
| JP | 2003-192823 | A | 7/2003 |
| WO | WO 01/42367 | A1 | 6/2001 |

OTHER PUBLICATIONS

U.S. Appl. No. 12/365,006, filed Feb. 2009, Ito, Hisayoshi.

*Primary Examiner*—Milton I Cano
*Assistant Examiner*—Gennadiy Mesh
(74) *Attorney, Agent, or Firm*—Birch, Stewart, Kolasch & Birch, LLP

(57) ABSTRACT

A shaped article (e.g., a porous material, and a spherical particle) comprising (A) a resin component is produced by kneading the resin component (A) (e.g., a thermoplastic resin) and a water-soluble auxiliary component (B) to prepare a dispersed composition, and eluting the auxiliary component (B) from the dispersed composition. The auxiliary component (B) may comprise 100 parts by weight of an oligosaccharide ($B_1$) and 0.5 to 100 parts by weight of a water-soluble plasticizing component ($B_2$) for plasticizing the oligosaccharide. The oligosaccharide ($B_1$) may comprise a tetrasaccharide. The plasticizing component ($B_2$) may comprise a saccharide or a sugar alcohol. Use of the dispersed composition ensures to form a shaped article having a given shape industrially with advantage even in the case of using a wide variety of resin components.

13 Claims, 1 Drawing Sheet

US 7,868,069 B2

DISPERSED COMPOSITION AND PROCESS FOR PRODUCING SHAPED ARTICLE USING THE SAME

This application is a Divisional of application Ser. No. 10/515,420, filed Nov. 23, 2004, now abandoned and claims priority to PCT International Application PCT/JP03/06171 filed May 16, 2003 under 35 U.S.C. §120. PCT International Application PCT/JP03/06171 claims priority to Japanese Application Nos. JP 2002-156112 and JP 2003-023536, filed on May 29, 2002 and Jan. 31, 2003, respectively. The entire contents of the above-cited applications are incorporated by reference in their entirety.

TECHNICAL FIELD

The present invention relates to a dispersed composition (or a resin composition forming a disperse system) which comprises a resin component and a water-soluble auxiliary component and is useful for shaping the resin component into a figure such as a porous material or a particulate, a process for producing a shaped article by using the dispersed composition, and a water-soluble auxiliary agent to be used in combination with a resin to form a dispersed composition.

BACKGROUND ART

For producing a resinous shaped article having a desired shape such as a porous material or a particle, various processes have been utilized. For example, Japanese Patent Application Laid-Open No. 2825/2001 (JP-2001-2825A) discloses a process for producing a porous material, comprising melt-kneading a pore-forming agent fusible at a molding temperature and a high molecular substance such as a resin, molding the kneaded matter to make a full (non-porous) shaped article containing the pore-forming agent, and then washing out the pore-forming agent from the full shaped article with a solvent. This document mentions pentaerythritol, L-erythritol and others as a pore-forming agent, and water or an organic solvent such as an alcohol compound as a solvent for eluting the pore-forming agent (auxiliary component). According to this process, a porous material having uniform fine pores can be produced.

However, in the case where a proportion of a pore-forming agent (erythritol having a low melting point or pentaerythritol having a high melting point) in a resin composition is increased, the resin composition is deteriorated in melt-kneading property and the size uniformity of the generated pores is decreased. More specifically, in kneading of the resin and erythritol, melting of erythritol having a low melting point induces decrease in viscosity of the resin composition and remarkable deterioration in melt-kneading property of the resin composition. Moreover, a resin composition containing pentaerythritol at a high proportion can be melt-kneaded, however, part of pentaerythritol remains as an unmelted matter and it is impossible to obtain a porous material having a uniform pore size.

Japanese Patent Application Laid-Open No. 176065/1998 (JP-10-176065A) discloses a process for obtaining a spherical fine particle of a thermoplastic resin (a), which comprises melt-kneading the thermoplastic resin (a) to be powdered with other one or more of thermoplastic resins (b) to give a resin composition comprising the resin (a) constituting the dispersed phase and the resin (b) constituting the continuous phase, and washing the resin composition with a solvent capable of dissolving the resin (a) and incapable of dissolving the resin (b).

In this process, however, it is necessary not only that the dispersed phase and the continuous phase are incompatible with each other, but also that an applicable combination of the resin constituting the continuous phase with the solvent is selected depending on the kind of the resin of the dispersed phase. Therefore, the combination of the resins should be limited to a specific one, and in addition, the combination of the resin with the solvent should be limited to a specific one. Further, in a step of cooling the dispersed composition, the resins incompatible with each other tend to form a large phase in the separation. Therefore, if the dispersed composition is not carefully solidified, the once produced dispersed phases will be gathered or aggregated again, and as a result, it is impossible to obtain a spherical fine particle having a given shape.

Furthermore, the resin constituting the continuous phase is finally recovered, or discarded in a dissolved state, because of being uninvolved in the resin fine particle as a product. However, recovery of the resin in the solution not only is very difficult but also is a caused factor of increase in the production cost of the resin particle. Moreover, in the case of discarding the resin solution directly as a waste fluid, there is concern about adverse effects on the environment.

Japanese Patent Application Laid-Open No. 13816/1985 (JP-60-13816A) proposes a process for producing a thermoplastic resin particle, which comprises melting a polyethylene glycol and a thermoplastic resin with stirring, then putting the molten mixture in water to solidify the both polymers, and then removing the polyethylene glycol from the resulting matter with water. Japanese Patent Application Laid-Open No. 9433/1986 (JP-61-9433A) discloses a process for producing a thermoplastic resin particle, which comprises melting a thermoplastic resin and a polyethylene oxide with stirring, then cooling the molten mixture, and removing the polyethylene oxide from the mixture with water. Japanese Patent Application Laid-Open No. 165457/1997 (JP-9-165457A) discloses a process for producing a resin fine particle, which comprises mixing a melt-formable and water-soluble polymer (such as a polyvinyl alcohol-series resin, a denatured starch, or a polyethylene oxide) and a thermoplastic resin to give a melt-shaped product, and then removing the water-soluble polymer from the shaped product with water.

Even in these processes, however, since it is necessary that a resin and a water-soluble polymer are incompatible with each other, a selectable combination of the resin is limited, and in addition, the particle size distribution of thus resulting resin particle is insufficient in uniformity. Further, these water-soluble polymers having small solubilities to water need a large amount of water for dissolution, and in addition, significantly deteriorate productivity of resin particles due to the slow velocity of dissolution. Furthermore, since such water-soluble polymers are often derived from unnatural products, a waste fluid containing such a water-soluble polymer dissolved therein adversely affects on the environment.

It is therefore an object of the present invention to provide a water-soluble auxiliary component (or a water-soluble auxiliary agent) being a saccharide yet kneadable with a resin component uniformly, and a dispersed composition (or a resin composition forming a disperse system) obtained by using the water-soluble auxiliary component.

It is another object of the present invention to provide a water-soluble auxiliary component (or a water-soluble auxiliary agent) capable of forming a given shaped article industrially with advantage even in the case of using a wide range of a resin component, and a dispersed composition (or a resin composition forming a disperse system) obtained by using the water-soluble auxiliary component.

It is still another object of the present invention to provide a water-soluble auxiliary component (or a water-soluble auxiliary agent) capable of being kneaded even if contained in a high proportion relative to a resin component and capable of forming a uniform phase-separation structure with the resin component, and a dispersed composition (or a resin composition for forming a disperse system) obtained by using the water-soluble auxiliary component.

It is a further object of the present invention to provide a process for producing a shaped article by using a dispersed composition (or a resin composition forming a disperse system) comprising a water-soluble auxiliary component (or a water-soluble auxiliary agent) and a resin component, wherein the water-soluble auxiliary component can not only be easily eluted with water but also reduce the burden on the environment.

It is a still further object of the present invention to provide a process for producing a shaped article having a uniform pore size or a uniform particle size.

DISCLOSURE OF THE INVENTION

The inventor of the present invention made intensive studies to achieve the above objects and finally found that a dispersed composition formed by using an auxiliary component comprising at least an oligosaccharide, which is a saccharide and yet kneadable with a resin uniformly in combination with a resin component can provide a shaped article having a uniform pore size or a uniform particle size by using a wide range of a resin component. The present invention was accomplished based on the above finding.

That is, the dispersed composition (or dispersion) of the present invention comprises (A) a resin component and (B) a water-soluble auxiliary component, and the auxiliary component (B) comprises at least ($B_1$) an oligosaccharide. The auxiliary component (B) may form a continuous phase in an islands-in-the-sea structure or in a bicontinuous phase. The resin component (A) may comprise a thermoplastic resin [for example, a polyester-series resin (e.g., an aliphatic polyester-series resin), a polyamide-series resin, a polyurethane-series resin, a poly(thio)ether-series resin, a polycarbonate-series resin, a polysulfone-series resin, a polyolefinic resin, a (meth)acrylic resin, a styrenic resin, a vinyl-series resin, a cellulose derivative, and a thermoplastic elastomer]. The oligosaccharide ($B_1$) may have a melting point or a softening point at a temperature higher than a heat distortion temperature of the resin component (A), or may be decomposed at a temperature higher than the heat distortion temperature of the resin component (A). For example, the melting point or softening point of the oligosaccharide ($B_1$) may be higher than the heat distortion temperature of the resin component (A), and may for example be about 90 to 290° C. Moreover, the oligosaccharide ($B_1$) may be thermally decomposed without having an obvious melting point or softening point at a temperature higher than the heat distortion temperature of the resin component (A). The heat distortion temperature of the resin may be, for example, determined as a Vicat softening point defined by Japanese Industrial Standards (JIS) K 7206. The heat distortion temperature (Vicat softening point) of the resin may be, for example, about 60 to 300° C., and preferably about 80 to 260° C. The oligosaccharide ($B_1$) may comprise a disaccharide, a trisaccharide, a tetrasaccharide, a pentasaccharide, a hexasaccharide, a heptasaccharide, an octasaccharide, a nonasaccharide, a decasaccharide, and others, or may comprise at least a tetrasaccharide. The oligosaccharide ($B_1$) may comprise maltotetraose, isomaltotetraose, stachyose, cellotetraose, scorodose, lychnose, and a tetraose having a sugar or sugar alcohol attached to a reducing end of panose. Moreover, the oligosaccharide ($B_1$) may comprise an oligosaccharide composition such as a starch sugar, a galactooligosaccharide, a coupling sugar, a fructooligosaccharide, a xylooligosaccharide, a soybean oligosaccharide, a chitin oligosaccharide or a chitosan oligosaccharide. The content of the tetrasaccharide in such an oligosaccharide ($B_1$) may be not less than 60% by weight. The viscosity of the 50% by weight aqueous solution of the oligosaccharide ($B_1$) may be not less than 1 Pa·s (e.g., about 3 to 100 Pa·s) as measured at a temperature of 25° C. by a B-type viscometer.

Further, the auxiliary component (B) may contain a water-soluble plasticizing component (or plasticizer) ($B_2$) for plasticizing the oligosaccharide ($B_1$). The combination use of the oligosaccharide ($B_1$) and the plasticizing component ($B_2$) ensures to plasticize or soften the oligosaccharide ($B_1$) effectively even when the oligosaccharide ($B_1$) is of thermally decomposable. The melting point or softening point of the plasticizing component ($B_2$) may be not higher than the heat distortion temperature (the above Vicat softening point) of the resin component (A). Moreover, the melt flow rate defined by JIS K 7210 of the auxiliary component (B) comprising the oligosaccharide ($B_1$) and the plasticizing component ($B_2$) may be not less than 1 (e.g., about 1 to 40) as measured at a temperature 30° C. higher than the heat distortion temperature of the resin component (A). The plasticizing component ($B_2$) may comprise a saccharide (e.g., a monosaccharide and a disaccharide) and a sugar alcohol, and others. Such a saccharide may comprise a reducing sugar. The monosaccharide may comprise a triose, a tetrose, a pentose, a hexose, a heptose, an octose, a nonose, a decose and a dodecose, and the disaccharide may comprise a homodisaccharide of the above monosaccharide and a heterodisaccharide of the above monosaccharides. The sugar alcohol may comprise a tetrytol (e.g., erythritol), a pentitol (e.g., pentaerythritol, arabitol, ribitol, and xylitol), a hexitol (e.g., sorbitol, dulcitol and mannitol), a heptitol, an octitol, a nonitol, a decitol and a dodecitol. Moreover, the ratio (weight ratio) of the resin component (A) relative to the auxiliary component (B) [the resin component (A)/the auxiliary component (B)] may be about 99/1 to 1/99. In the auxiliary component (B), the ratio (weight ratio) of the oligosaccharide ($B_1$) relative to the plasticizing component ($B_2$) [the oligosaccharide ($B_1$)/the plasticizing component ($B_2$)] may be about 99/1 to 50/50.

The present invention also includes a water-soluble auxiliary agent used in combination with a resin to form a dispersed composition, wherein the water-soluble auxiliary agent comprises at least an oligosaccharide ($B_1$). Further, the present invention also includes a process for producing a shaped article comprising a resin component (A), comprising eluting an auxiliary component (B) from the dispersed composition, and the shaped article may include a porous material having an average pore size of 0.1 to 100 μm and a coefficient of variation of the pore size of not greater than 60, and a particle having an average particle size of 0.1 to 100 μm and a coefficient of variation of the particle size of not greater than 60.

Incidentally, in the present invention, the dispersed composition may be a resin composition forming a disperse system containing a resin component and an auxiliary component, and may be used synonymously with the term "resin composition" accordingly. Moreover, the water-soluble auxiliary component may be referred to as a pore-forming agent.

DETAILED DESCRIPTION OF THE INVENTION

Resin Component (A)

Figure 1:
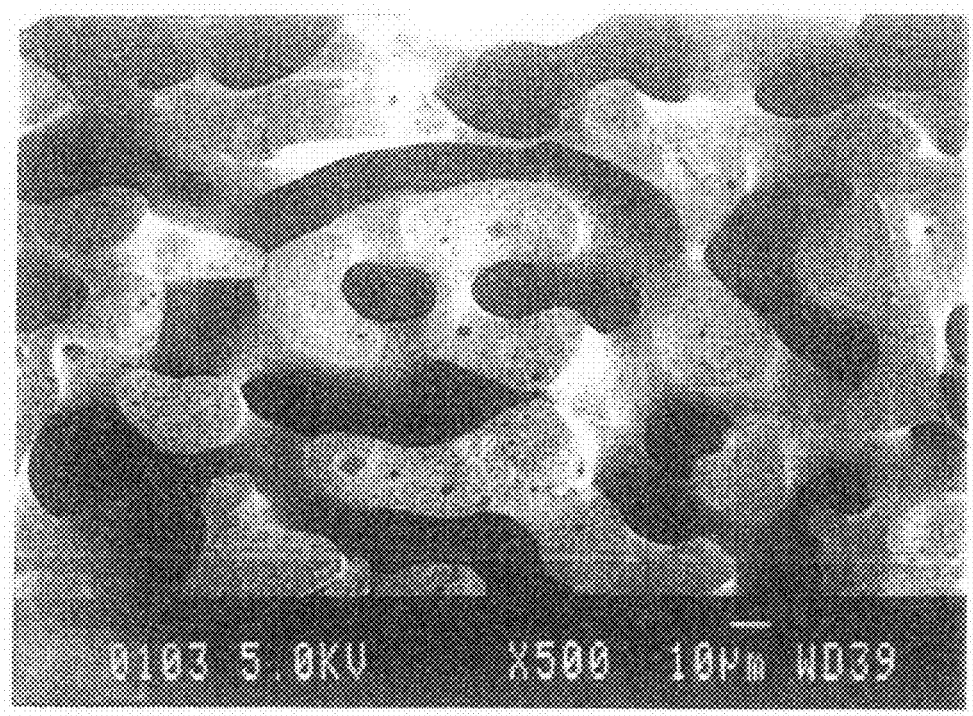
FIG. 1 is a scanning electron micrograph of a cross section of a porous material obtained in Example 2.

Examples of a resin constituting the resin component include a thermoplastic resin [for example, a condensation-series thermoplastic resin such as a polyester-series resin (e.g., an aromatic polyester-series resin, and an aliphatic polyester-series resin), a polyamide-series resin, a polyurethane-series resin, a poly(thio)ether-series resin (e.g., a poly-acetal-series resin, a polyphenylene ether-series resin, a polysulfide-series resin, and a polyether ketone-series resin), a polycarbonate-series resin, a polysulfone-series resin, or a polyimide-series resin; a vinyl polymerization-series thermoplastic resin such as a polyolefinic resin, a (meth)acrylic resin, a styrenic resin, or a vinyl-series resin (e.g., a halogen-containing resin, a vinyl ester-series resin, and a vinyl alcohol-series resin); and a resin derived from a natural product, such as a cellulose derivative], and a thermosetting resin (e.g., an epoxy resin, an unsaturated polyester resin, a diallyl phthalate resin, and a silicone resin). These resins may be used singly or in combination. As the resin component, a thermoplastic resin, or a water-insoluble resin (e.g., a water-insoluble thermoplastic resin) is usually employed.

(Thermoplastic Resin)

(1) Polyester-Series Resin

The polyester-series resin includes, for example, a homopolyester or copolyester obtained by a polycondensation of a dicarboxylic acid component and a diol component; a homopolyester or copolyester obtained by a polycondensation of a hydroxycarboxylic acid; and a homopolyester or copolyester obtained by a ring opening polymerization of a lactone. These polyester-series resins may be used singly or in combination.

The dicarboxylic acid component includes, for example, an aromatic dicarboxylic acid [e.g., an aromatic dicarboxylic acid having about 8 to 20 carbon atoms, such as terephthalic acid, isophthalic acid, phthalic acid; an alkyl-substituted phthalic acid such as methylterephthalic acid or methylisophthalic acid; a naphthalenedicarboxylic acid (e.g., 2,6-naphthalenedicarboxylic acid, 2,7-naphthalenedicarboxylic acid, and 1,5-naphthalenedicarboxylic acid); a diphenyldicarboxylic acid such as 4,4'-diphenyldicarboxylic acid or 3,4'-diphenyldicarboxylic acid; a diphenoxyethanedicarboxylic acid such as 4,4'-diphenoxyethanedicarboxylic acid; a diphenyl ether-dicarboxylic acid such as diphenyl ether-4,4'-dicarboxylic acid; a diphenylalkanedicarboxylic acid such as diphenylmethanedicarboxylic acid or diphenylethanedicarboxylic acid; or a diphenylketonedicarboxylic acid], an aliphatic dicarboxylic acid (e.g., an aliphatic dicarboxylic acid having about 2 to 40 carbon atoms, such as oxalic acid, succinic acid, adipic acid, azelaic acid, sebacic acid, dodecanoic diacid, hexadecanedicarboxylic acid, or dimeric acid), and an alicyclic dicarboxylic acid (e.g., an alicyclic dicarboxylic acid having about 8 to 12 carbon atoms, such as cyclohexanedicarboxylic acid, hexahydrophthalic acid, hexahydroisophthalic acid, hexahydroterephthalic acid, or himic acid). These dicarboxylic acid components may be used singly or in combination.

Incidentally, the dicarboxylic acid component also includes an ester-formable derivative, e.g., a lower alkyl ester such as a dimethyl ester, an acid anhydride, and an acid halide such as an acid chloride.

Examples of the diol component include an aliphatic $C_{2-12}$diol (e.g., a $C_{2-12}$alkanediol such as ethylene glycol, propylene glycol, trimethylene glycol, 1,4-butanediol, 1,3-butanediol, neopentyl glycol, or hexanediol; and a (poly)oxy$C_{2-4}$alkylene glycol such as diethylene glycol, triethyleneglycol, or dipropyleneglycol); and an alicyclic $C_{6-12}$diol (e.g., cyclohexanediol, and cyclohexanedimethanol); an aromatic $C_{6-20}$diol (e.g., a benzenediol compound such as resorcinol or hydroquinone; a naphthalenediol compound; a bisphenol compound such as bisphenol A, F, or AD; and an adduct of a bisphenol compound with an alkylene oxide). These diol components may be used singly or in combination.

The hydroxycarboxylic acid includes, for example, an aliphatic $C_{2-6}$hydroxycarboxylic acid such as glycolic acid, lactic acid, hydroxypropionic acid, hydroxybutyric acid, glyceric acid, or tartronic acid; and an aromatic hydroxycarboxylic acid such as hydroxybenzoic acid, or hydroxynaphthoic acid. These hydroxycarboxylic acids may be used singly or in combination.

Examples of the lactone include a $C_{3-12}$lactone such as propiolactone, butyrolactone, valerolactone, or caprolactone. These lactones may be used singly or in combination. Among these lactones, a $C_{4-10}$lactone, in particular caprolactone (e.g., ε-caprolactone), is preferred.

The polyester-series resin includes an aromatic polyester-series resin, an aliphatic polyester-series resin, and others.

Examples of the aromatic polyester-series resin include a homopolyester or copolyester obtained by polycondensation of the aromatic dicarboxylic acid (preferably, e.g., an aromatic dicarboxylic acid having about 8 to 20 carbon atoms, such as terephthalic acid, isophthalic acid, phthalic acid or naphthalenedicarboxylic acid) and the aliphatic diol (preferably, e.g., an aliphatic $C_{2-12}$diol such as ethylene glycol, propylene glycol, 1,4-butanediol or 1,3-butanediol) or the alicyclic diol (preferably, e.g., an alicyclic $C_{6-20}$diol such as cyclohexanedimethanol), and preferably include a homopolyester or copolyester having an alkylene arylate unit such as an alkylene terephthalate or an alkylene naphthalate as a main unit (e.g., not less than 50% by weight). The copolymerizable component may include a polyoxy$C_{2-4}$alkylene glycol having a repeating oxyalkylene unit of about 2 to 4 [e.g., a glycol compound containing a poly(oxy$C_{2-4}$alkylene) unit such as diethylene glycol], or an aliphatic dicarboxylic acid having about 6 to 12 carbon atoms (e.g., adipic acid, pimelic acid, suberic acid, azelaic acid, and sebacic acid).

More specifically, as the aromatic polyester-series resin, there may be exemplified a polyalkylene terephthalate [e.g., a polycycloalkanediC$_{1-4}$alkylene terephthalate such as a poly (1,4-cyclohexyldimethylene terephthalate) (PCT); and a polyC$_{2-4}$alkylene terephthalate such as a polyethylene terephthalate (PET) or a polybutylene terephthalate (PBT)], a polyC$_{2-4}$alkylene naphthalate corresponding to the polyalkylene terephthalate (e.g., polyethylene naphthalate), a polyethylene terephthalate copolyester containing an ethylene terephthalate unit as a main unit, and a polybutylene terephthalate copolyester containing a butylene terephthalate unit as a main unit. The aromatic polyester-series resin may be a liquid crystalline polyester.

Examples of the aliphatic polyester-series resin include a homopolyester or copolyester obtained by a polycondensation of the aliphatic dicarboxylic acid component (e.g., an aliphatic dicarboxylic acid having about 2 to 6 carbon atoms, such as oxalic acid, succinic acid or adipic acid, and preferably oxalic acid or succinic acid) and the aliphatic diol component (e.g., an aliphatic $C_{2-6}$ diol such as ethylene glycol, propylene glycol, 1,4-butanediol, 1,3-butanediol, neopentyl glycol or hexanediol, and preferably an aliphatic $C_{2-4}$ diol such as ethylene glycol, 1,4-butanediol or neopentyl glycol), a homopolyester or copolyester of the aliphatic hydroxycarboxylic acid (e.g., an aliphatic $C_{2-6}$ hydroxycarboxylic acid such as glycolic acid, lactic acid, hydroxypropionic acid or hydroxybutyric acid, and preferably an aliphatic $C_{2-4}$ hydroxycarboxylic acid such as glycolic acid or lactic acid), and a homopolylactone or copolylactone obtained by a ring opening polymerization of the lactone (preferably, a $C_{4-10}$ lactone such as caprolactone) with an initiator (a bifunctional or trifunctional initiator, e.g., an active hydrogen-containing compound such as an alcohol compound). The copolymerizable component may include a polyoxy$C_{2-4}$ alkylene glycol having a repeating oxyalkylene unit number of about 2 to 4 [e.g., a glycol compound containing a poly(oxy$C_{2-4}$ alkylene) unit such as diethylene glycol], or an aliphatic dicarboxylic acid having about 6 to 12 carbon atoms (e.g., adipic acid, pimelic acid, suberic acid, azelaic acid, and sebacic acid).

More specifically, the aliphatic polyester-series resin includes, for example, a polyester-series resin obtained by a polycondensation of a dicarboxylic acid component and a diol component (for example, a poly$C_{2-6}$ alkylene oxalate such as a polyethylene oxalate, a polybutylene oxalate or a polyneopentylene oxalate; a poly$C_{2-6}$ alkylene succinate such as a polyethylene succinate, a polybutylene succinate or a polyneopentylene succinate; and a poly$C_{2-6}$ alkylene adipate such as a polyethylene adipate, a polybutylene adipate or a polyneopentylene adipate), a polyhydroxycarboxylic acid-series resin (e.g., a polyglycolic acid, and a polylactic acid), and a polylactone-series resin [e.g., a poly$C_{3-12}$ lactone-series resin such as a polycaprolactone (e.g., "PCLH7", "PCLH4" and "PCLH1" manufactured by Daicel Chemical Industries, Ltd.)]. The concrete examples of the copolyester include a copolyester containing two kinds of dicarboxylic acid components (e.g., a poly$C_{2-4}$ alkylene succinate-adipate copolymer resin such as a polyethylene succinate-adipate copolymer resin or a polybutylene succinate-adipate copolymer resin), and a copolyester obtained from a dicarboxylic acid component, a diol component and a lactone (e.g., a polycaprolactone-polybutylene succinate copolymer resin).

The polyester-series resin used in the present invention may be a polyester-series resin containing a urethane bond (for example, an aliphatic polyester-series resin containing a urethane bond). The polyester-series resin containing a urethane bond preferably includes a resin obtained from the above polyester-series resin (e.g., a polyester diol having a low molecular weight) and having a high molecular weight increased by a diisocyanate compound (e.g., an aliphatic diisocyanate).

The diisocyanate compound may includes an aromatic diisocyanate (e.g., a phenylene diisocyanate, a tolylene diisocyanate, and diphenylmethane-4,4'-diisocyanate), an araliphatic diisocyanate compound (e.g., a xylylene diisocyanate), an alicyclic diisocyanate compound (e.g., isophorone diisocyanate), an aliphatic diisocyanate compound (e.g., trimethylene diisocyanate, tetramethylene diisocyanate, pentamethylene diisocyanate, hexamethylene diisocyanate, lysine diisocyanatemethyl ester, and trimethylhexamethylene diisocyanate), and others. These diisocyanate compounds may be used singly or in combination. Among these diisocyanate compounds, the aliphatic diisocyanate compound, e.g., hexamethylene diisocyanate, may be preferably used.

Examples of the polyester-series resin containing a urethane bond (e.g., an aliphatic polyester-series resin) include "BIONOLLE #1000" series, "BIONOLLE #3000" series and "BIONOLLE #6000" series manufactured by Showa Highpolymer Co., Ltd.

(2) Polyamide-Series Resin

The polyamide-series resin includes, for example, an aliphatic polyamide-series resin, an alicyclic polyamide-series resin, and an aromatic polyamide-series resin, and the aliphatic polyamide-series resin is usually employed. These polyamide-series resins may be used singly or in combination.

Examples of the aliphatic polyamide-series resin include a condensate (or condensed product) of an aliphatic diamine component (a $C_{4-10}$ alkylenediamine such as tetramethylenediamine or hexamethylenediamine) and an aliphatic dicarboxylic acid component (e.g., a $C_{4-20}$ alkylenedicarboxylic acid such as adipic acid, sebacic acid or dodecanoic diacid) (for example, a polyamide 46, a polyamide 66, a polyamide 610, a polyamide 612, a polyamide 1010, a polyamide 1012, and a polyamide 1212); a homo- or copolymer of a lactam (e.g., a $C_{4-20}$ lactam such as ε-caprolactam or ω-laurolactam) or an aminocarboxylic acid (e.g., a $C_{4-20}$ aminocarboxylic acid such as ω-aminoundecanoic acid) (for example, a polyamide 6, a polyamide 11, and a polyamide 12); and a copolyamide having these polyamide components copolymerized therein (for example, a polyamide 6/11, a polyamide 6/12, a polyamide 66/11, and a polyamide 66/12).

Further, the polyamide-series resin may have biodegradability. The biodegradable polyamide-series resin may include a polyester amide as a condensate of the aliphatic diamine component (a $C_{4-10}$ alkylenediamine such as tetramethylenediamine or hexamethylenediamine), the aliphatic dicarboxylic acid component (e.g., a $C_{4-20}$ alkylenedicarboxylic acid such as adipic acid, sebacic acid or dodecanoic diacid) and the aliphatic diol component (e.g., a $C_{2-12}$ alkanediol such as ethylene glycol, propylene glycol or butanediol).

(3) Polyurethane-Series Resin

The polyurethane-series resin may be obtained by a reaction between a diisocyanate compound and a polyol compound (e.g., a diol compound) and, if necessary, a chain-extension agent. As the diisocyanate compound, there are exemplified an aliphatic diisocyanate compound such as hexamethylene diisocyanate or 2,2,4-trimethylhexamethylene diisocyanate; an alicyclic diisocyanate compound such as 1,4-cyclohexane diisocyanate or isophorone diisocyanate; an aromatic diisocyanate compound such as a phenylene diisocyanate, a tolylene diisocyanate, diphenylmethane-4,4'-diisocyanate or 1,5-naphthalene diisocyanate; an araliphatic diisocyanate compound such as a xylylene diisocyanate; and others.

The polyol compound includes, for example, a polyester polyol, a polyether polyol, and a polycarbonate polyol. Among the polyol compounds, a diol compound (e.g., a polyester diol, a polyether diol, and a polycarbonate diol) is particularly preferred. These polyol compounds may be used singly or in combination.

Examples of a compound available as the diol compound include a polyester diol (e.g., a polyester diol derived from a $C_{4-12}$ aliphatic dicarboxylic acid component such as succinic acid, adipic acid or azelaic acid, and a $C_{2-12}$ aliphatic diol component ethylene glycol, propylene glycol, butanediol or neopentyl glycol; a polyester diol derived from a $C_{4-12}$ lactone component such as ε-caprolactone; and a polyester diol derived from the aliphatic dicarboxylic acid component and/or the aliphatic diol component, and the lactone component), a polyether diol (e.g., a polyethylene glycol, a polypropylene glycol, a polyoxyethylene-polyoxypropylene block copolymer, a polyoxytetramethylene glycol, and a bisphenol A-alkylene oxide adduct), and a polyester ether diol (e.g., a polyester diol obtained by using the polyether diol as part of the diol component).

Further, as the chain-extension agent, there may be used a $C_{2-10}$alkylene glycol such as ethylene glycol or propylene glycol, and, in addition, a diamine compound [for example, an aliphatic diamine compound (a linear or branched alkylenediamine such as ethylenediamine, trimethylenediamine or tetramethylenediamine; and a linear or branched polyalkylenepolyamine such as diethylenetriamine, triethylenetetramine, tetraethylenepentamine or dipropylenetriamine), an alicyclic diamine compound (e.g., isophoronediamine), and an aromatic diamine compound (e.g., phenylenediamine, and xylylenediamine)]. These polyurethane-series resins may be used singly or in combination.

(4) Poly(thio)ether-Series Resin

Examples of the poly(thio)ether-series resin include a polyoxyalkylene-series resin, a polyphenylene ether-series resin, and a polysulfide-series resin (polythioether-series resin). The polyoxyalkylene-series resin includes, for example, a polyoxy$C_{1-4}$alkylene glycol such as a polyoxymethylene glycol, a polyoxypropylene glycol, a polyoxytetramethylene glycol, or a polyoxyethylene-polyoxypropylene block copolymer. These poly(thio)ether-series resins may be used singly or in combination.

(5) Polycarbonate-Series Resin

The polycarbonate-series resin includes, for example, an aromatic polycarbonate containing a bisphenol compound (e.g., bisphenol A) as a base unit, and an aliphatic polycarbonate such as diethylene glycol bisallyl carbonate. These polycarbonate-series resins may be used singly or in combination.

(6) Polysulfone-Series Resin

Examples of the polysulfone-series resin include a polysulfone resin obtained by polycondensation of a dihalogenodiphenyl sulfone (e.g., dichlorodiphenyl sulfone) and a bisphenol compound (e.g., bisphenol A or a metal salt thereof), a polyether sulfone resin, and a polyallyl sulfone resin. These polysulfone-series resins may be used singly or in combination.

(7) Polyolefinic Resin

The polyolefinic resin may include a homo- or copolymer of an α-$C_{2-6}$olefin, for example, a homo- or copolymer of an olefin such as a polyethylene, a polypropylene, an ethylene-propylene copolymer or a poly(methylpentene-1), and a copolymer of an olefin and a copolymerizable monomer (e.g., an ethylene-vinyl acetate copolymer, an ethylene-(meth) acrylic acid copolymer, and an ethylene-(meth)acrylate copolymer). These polyolefinic resins may be used singly or in combination.

(8) (Meth)acrylic Resin

As the (meth)acrylic resin, there may be mentioned a homo- or copolymer of a (meth)acrylic monomer [e.g., (meth)acrylic acid, a $C_{1-18}$alkyl (meth)acrylate, a hydroxyalkyl (meth)acrylate, a glycidyl (meth)acrylate, and (meth) acrylonitrile], for example, a poly(meth)acrylate such as a poly(methyl (meth)acrylate), a methyl methacrylate-(meth) acrylic acid copolymer, a methylmethacrylate-acrylate-(meth) acrylic acid copolymer, a methyl methacrylate-(meth) acrylate copolymer, and a (meth)acrylate-styrene copolymer (e.g., an MS resin). The preferred (meth)acrylic resin includes a $C_{1-5}$alkyl poly(meth)acrylate, a methyl methacrylate-acrylate copolymer, a (meth)acrylate-styrene copolymer (e.g., an MS resin), and others. These (meth) acrylic resins may be used singly or in combination.

(9) Styrenic Resin

Examples of the styrenic resin include a homo- or copolymer of a styrenic monomer (e.g., styrene, α-methylstyrene, and vinyl toluene) (for example, a polystyrene, a styrene-vinyl toluene copolymer, and a styrene-α-methylstyrene copolymer), a copolymer of a styrenic monomer and copolymerizable monomer(s) [for example, a copolymer such as a styrene-acrylonitrile copolymer (an AS resin), a (meth)acrylate-styrene copolymer (e.g., an MS resin), a styrene-maleic anhydride copolymer, or a styrene-butadiene block copolymer; a styrenic graft copolymer such as an acrylonitrile-acrylate-styrene copolymer (an AAS resin), an acrylonitrile-chlorinated polyethylene-styrene copolymer (an ACS resin), or an acrylonitrile-vinyl acetate-styrene copolymer (e.g., an AXS resin); and a graft polymer obtained by a graft polymerization of at least a styrenic monomer in the presence of a rubber component, for example, a high impact polystyrene (HIPS, or rubber-grafted polystyrenic resin), an acrylonitrile-butadiene-styrene copolymer (an ABS resin), and an acrylonitrile-ethylene propylene rubber-styrene copolymer (an AES resin)]. These styrenic resins may be used singly in combination.

(10) Vinyl-Series Resin

Examples of the vinyl-series resin include a homo- or copolymer of a vinyl-series monomer, or a copolymer of a vinyl-series monomer and other copolymerizable monomer. The vinyl-series monomer includes, for example, a halogen-containing vinyl monomer [for example, chlorine atom-containing vinyl monomer (e.g., vinyl chloride, vinylidene chloride, and chloroprene), and a fluorine atom-containing vinyl monomer (e.g., fluoroethylene)], and a vinyl carboxylate [for example, a vinyl ester such as vinyl acetate, vinyl propionate, vinyl crotonate or vinyl benzoate]. These vinyl-series resins may be used singly or in combination.

As the vinyl-series resin, for example, there may be mentioned a vinyl chloride-series resin (e.g., a polyvinyl chloride, a polyvinylidene chloride, a vinyl chloride-vinyl acetate copolymer, and a vinylidene chloride-vinyl acetate copolymer), a folurocarbon resin (e.g., a polyvinyl fluoride, a polyvinylidene fluoride, a polychlorotrifluoroethylene, a tetrafluoroethylene-hexafluoropropylene copolymer, a tetrafluoroethylene-perfluoroalkyl vinyl ether copolymer, and a tetrafluoroethylene-ethylene copolymer), and a vinyl ester-series resin (e.g., a polyvinyl acetate, a vinyl acetate-ethylene copolymer, an ethylene-vinyl acetate copolymer, a vinyl acetate-vinyl chloride copolymer, and a vinyl acetate-(meth)acrylate copolymer).

As the vinyl ester-series resin, a derivative of the vinyl ester-series resin may be also used [for example, a vinyl alcohol-series resin (e.g., such as a polyvinyl alcohol, a polyvinyl acetal such as a polyvinyl formal or a polyvinyl butyral, and an ethylene-vinyl alcohol copolymer)]. Among these vinyl alcohol-series resins, the ethylene-vinyl alcohol copolymer is preferred. In the case of using the ethylene-vinyl alcohol copolymer, an excessively high ethylene content of the copolymer decreases interaction between the copolymer and the auxiliary component (B) due to deterioration in hydrophilicity of the resin (i.e., the copolymer). The ethylene content of the copolymer is therefore preferred to be 10 to 40% by weight.

(11) Cellulose Derivative

Examples of the cellulose derivative include a cellulose ester compound (e.g., a cellulose acetate, and a cellulose phthalate), a cellulose carbamate compound (e.g., a cellulose phenylcarbamate), and a cellulose ether compound (e.g., a cyanoethyl cellulose). These cellulose derivatives may be used singly or in combination.

As the cellulose ester, for example, there may be mentioned an organic acid ester of a cellulose (or an acyl cellulose), e.g., a cellulose acetate (an acetyl cellulose) such as a cellulose diacetate or a cellulose triacetate, a cellulose propionate, a cellulose butyrate, a cellulose acetate propionate, and a cellulose acetate butyrate; an inorganic acid ester of a cellulose such as a cellulose nitrate, a cellulose sulfate or a cellulose phosphate; and a mixed acid ester of a cellulose such as a cellulose nitrate acetate.

The cellulose ether includes, for example, an alkyl cellulose (e.g., a $C_{2-6}$alkyl cellulose such as an ethyl cellulose, an isopropyl cellulose or a butyl cellulose), an aralkyl cellulose (e.g., a benzyl cellulose), a hydroxyalkyl cellulose (e.g., a hydroxy$C_{4-6}$alkyl cellulose such as a hydroxybutyl cellulose), a carboxyalkyl cellulose (e.g., a carboxy$C_{2-6}$alkyl cellulose such as a carboxyethyl cellulose), and a cyanoethyl cellulose.

In view of biodegradability, it is preferred that the substitution degree of the cellulose derivative is low. For example, the average substitution degree is not more than 2.5, preferably not more than 2 (e.g., about 0.1 to 2), and more preferably not more than 1.5 (e.g., about 0.1 to 1.5).

(12) Thermoplastic Elastomer

Examples of the thermoplastic elastomer include a polyamide-series elastomer, a polyester-series elastomer, a polyurethane-series elastomer, a polystyrenic elastomer, a polyolefinic elastomer, a polyvinyl chloride-series elastomer, and a fluorine-containing thermoplastic elastomer. These thermoplastic elastomers may be used singly or in combination.

In the case where the thermoplastic elastomer is a block copolymer, the block structure is not particularly limited to a specific one, and may be a triblock structure, a multiblock structure, a star-shaped (or astral) block structure, and others.

The heat distortion temperature of the resin component (e.g., a Vicat softening point defined by JIS K 7206) may be selected from the range of 60 to 300° C., and for example, may be about 80 to 260° C., preferably about 100 to 240° C. (e.g., about 110 to 240° C.), and more preferably about 120 to 230° C. (e.g., about 130 to 220° C.). The preferred resin includes, for example, a polyamide-series resin, a polyolefinic resin, a styrenic resin, a vinyl-series resin (e.g., a halogen-containing resin, a vinyl ester-series resin, and a vinyl alcohol-series resin), and a biodegradable resin [for example, an aliphatic polyester-series resin (e.g., a polylactic acid-series resin, and a poly$C_{3-12}$lactone-series resin), a biodegradable polyester-series resin such as a polyesteramide, a vinyl alcohol-series resin, and the cellulose derivative]. Incidentally, in order to facilitate melt-kneading of the resin component with an auxiliary component (B), a resin having a hydrophilic group such as an amino group, a hydroxyl group or a carboxyl group may be used as the resin component.

Since the shaped article comprising the biodegradable resin is excellent in biodegradability, the shaped article may be useful for example in the field of being used in natural environments (e.g., materials for agriculture, forestry and fisheries, civil engineering materials, construction materials, and products for outdoor leisure activity), in the field (application) having difficulty in recovery after use and recycle (e.g., food packaging films, food packaging containers (or trays), sanitary goods, and articles for everyday use), and in the field of taking advantage of special functions of the resin (e.g., medical materials requiring biodegradation and bioabsorbability, and covering materials requiring sustained release).

[Water-Soluble Auxiliary Agent]

The water-soluble auxiliary agent comprises a water-soluble auxiliary component (B) comprising at least an oligosaccharide ($B_1$), and is used in combination with a resin to form a dispersed composition. Further, in order to adjust a thermal melting property of the oligosaccharide, it is preferred that the water-soluble auxiliary agent further comprises a plasticizing component ($B_2$).

($B_1$) Oligosaccharide

The oligosaccharide ($B_1$) is classified broadly into two groups: a homooligosaccharide condensed by dehydration of 2 to 10 monosaccharide molecules through glycoside linkage (s), and an heterooligosaccharide condensed by dehydration of 2 to 10 molecules of at least not less than two kinds of monosaccharides and/or sugar alcohols through glycoside linkage(s). The oligosaccharide ($B_1$) includes, for example, a disaccharide to a decasaccharide, and usually, an oligosaccharide of a disaccharide to a hexasaccharide is employed. The oligosaccharide is usually a solid at room temperatures. Incidentally, these oligosaccharides may be an anhydrate. Moreover, in the oligosaccharide, a monosaccharide may bond with a sugar alcohol. These oligosaccharides may be used singly or in combination. Incidentally, the oligosaccharide may be an oligosaccharide composition comprising a plurality of sugar components. Such an oligosaccharide composition is sometimes simply referred to as an oligosaccharide.

Examples of the disaccharide include a homooligosaccharide such as a trehalose (e.g., α,α-trehalose, β,β-trehalose, and α,β-trehalose), kojibiose, nigerose, maltose, isomaltose, sophorose, laminaribiose, cellobiose or gentiobiose; and a heterooligosaccharide such as lactose, sucrose, palatinose, melibiose, rutinose, primeverose or turanose.

As the trisaccharide, there may be mentioned a homooligosaccharide such as maltotriose, isomaltotriose, panose or cellotriose; a heterooligosaccharide such as manninotriose, solatriose, melezitose, planteose, gentianose, umbelliferose, lactosucrose or raffinose; and others.

Examples of the tetrasaccharide include a homooligosaccharide such as maltotetraose or isomaltotetraose; and a heterooligosaccharide such as stachyose, cellotetraose, scorodose, lychnose, or a tetraose having a sugar or sugar alcohol attached to a reducing end of panose.

Among these tetrasaccharides, the tetraose having a sugar or sugar alcohol attached to a reducing end of panose is disclosed in, for example, Japanese Patent Application Laid-Open No. 215892/1998 (JP-10-215892A), and includes a tetraose having a monosaccharide (such as glucose, fructose, mannose, xylose or arabinose) or a sugar alcohol (such as sorbitol, xylitol or erythritol) attached to a reducing end of panose.

The pentasaccharide may include a homooligosaccharide such as maltopentaose or isomaltopentaose; and a heterooligosaccharide such as a pentaose having a disaccharide attached to a reducing end of panose.

The pentaose having a disaccharide attached to a reducing end of panose is also disclosed in, for example, Japanese Patent Application Laid-Open No. 215892/1998 (JP-10-215892A), and includes a pentaose having a disaccharide (such as sucrose, lactose, cellobiose or trehalose) attached to a reducing end of panose.

Examples of the hexasaccharide include a homooligosaccharide such as maltohexaose or isomaltohexaose.

The oligosaccharide preferably comprises at least a tetrasaccharide from the viewpoint of a melt-kneading property with the resin component.

The oligosaccharide may be an oligosaccharide composition produced by decomposition of a polysaccharide. The oligosaccharide composition usually contains a tetrasaccharide. The oligosaccharide composition includes, for example, a starch sugar (a saccharification product of a starch (or a saccharified starch)), a galactooligosaccharide, a coupling sugar, a fructooligosaccharide, a xylooligosaccharide, a soybean oligosaccharide, a chitin oligosaccharide, and a chitosan oligosaccharide. These oligosaccharide compositions may be used singly or in combination.

For example, the starch sugar is an oligosaccharide composition obtained by making an acid or glucoamylase or the like act on a starch, and may be an oligosaccharide mixture obtained by bonding a plurality of glucoses to each other. The starch sugar includes, for example, a reduced starch-saccharified manufactured by Towa Chemical Industry Co., Ltd. (brand name "PO-10", the tetrasaccharide content is not less than 90% by weight).

The galactooligosaccharide is an oligosaccharide composition obtained by making β-galactosidase or the like act on lactose, and may be a mixture of galactosyllactose and a galactose-(glucose)$_n$ ("n" denotes an integer of 1 to 4).

The coupling sugar is an oligosaccharide composition obtained by making cyclodextrin synthetase (CGTase) act on a starch and sucrose, and may be a mixture of a (glucose)$_n$-sucrose ("n" denotes an integer of 1 to 4).

The fructooligosaccharide is an oligosaccharide composition obtained by making fructofuranosidase act on sucrose, and may be a mixture of a sucrose-(fructose)$_n$ ("n" denotes an integer of 1 to 4).

Concerning these oligosaccharide compositions, in order to inhibit rapid decrease of the viscosity in melt-kneading, the content of the trisaccharide or the tetrasaccharide (in particular, the tetrasaccharide) in the oligosaccharide composition is, for example, not less than 60% by weight (about 60 to 100% by weight), preferably not less than 70% by weight (about 70 to 100% by weight), more preferably not less than 80% by weight (about 80 to 100% by weight), and particularly not less than 90% by weight (about 90 to 100% by weight).

The oligosaccharide may be a reducing-type (maltose-type), or a non-reducing-type (trehalose-type). The reducing-type oligosaccharide is preferred because of excellence in heat resistance.

The reducing-type oligosaccharide is not particularly limited to a specific one as far as the oligosaccharide has a free aldehyde group or ketone group to exhibit a reducing property. For example, the reducing-type oligosaccharide includes a disaccharide such as kojibiose, nigerose, maltose, isomaltose, sophorose, laminaribiose, cellobiose, gentiobiose, lactose, palatinose, melibiose, rutinose, primeverose or turanose; a trisaccharide such as maltotriose, isomaltotriose, panose, cellotriose, manninotriose or solatriose; a tetrasaccharide such as maltotetraose, isomaltotetraose, cellotetraose or lychnose; a pentasaccharide such as maltopentaose or isomaltopentaose; and a hexasaccharide such as maltohexaose or isomaltohexaose.

Since the oligosaccharide is generally a natural polysaccharide derivative, or a product derived from natural product being manufactured by reducing the derivative, the oligosaccharide can reduce the burden on the environment.

In order to disperse the resin component and the auxiliary component effectively by kneading, it is desirable that the oligosaccharide has a high viscosity. More specifically, in the case where the viscosity of the 50% by weight aqueous solution of the oligosaccharide is measured at a temperature of 25° C. by using a B-type viscometer, the viscosity is not less than 1 Pa·s (e.g., about 1 to 500 Pa·s), preferably not less than 2 Pa·s (e.g., about 2 to 250 Pa·s, and in particular about 3 to 100 Pa·s), more preferably not less than 4 Pa·s (e.g., about 4 to 50 Pa·s), and particularly not less than 6 Pa·s (e.g., about 6 to 50 Pa·s), and it is preferred to use an oligosaccharide having a high viscosity.

Moreover, the melting point or softening point of the oligosaccharide ($B_1$) is preferably higher than the heat distortion temperature (e.g., a Vicat softening point defined by JIS K 7206) of the resin component (A). Incidentally, depending on the kind or species of the oligosaccharide (e.g., in the case of a starch sugar such as a reduced starch-saccharified), the oligosaccharide is sometimes thermally decomposed without having a melting point or softening point. In such a case, the decomposition temperature may be considered as the "melting point or softening point" of the oligosaccharide ($B_1$).

The temperature difference between the melting point or softening point of the oligosaccharide ($B_1$) and the heat distortion temperature of the resin component (A) is, for example, not less than 1° C. (e.g., about 1 to 80° C.), preferably not less than 10° C. (e.g., about 10 to 70° C.), and more preferably not less than 15° C. (e.g., about 15 to 60° C.). The melting point or softening point of the oligosaccharide ($B_1$) may be selected from the range of 70 to 300° C. depending on the kind of the resin component (A) and other factor(s), and may be, for example, about 90 to 290° C., preferably about 100 to 280° C. (e.g., about 110 to 270° C.), and more preferably about 120 to 260° C. (e.g., about 130 to 260° C.). Incidentally, an anhydride of an oligosaccharide generally has a high melting point or softening point. For example, in the case of a trehalose, the melting point of the dihydrate is 97° C. and that of the anhydride is 203° C. In the case where the melting point or softening point of the oligosaccharide is higher than the heat distortion temperature of the resin component (A), the oligosaccharide can be not only prevented from rapid deterioration of the viscosity in melt-kneading but also inhibited from thermal degradation.

Further, according to the present invention, the combination of the oligosaccharide ($B_1$) and the water-soluble plasticizing component ($B_2$) for plasticizing the oligosaccharide ($B_1$) in the water-soluble auxiliary component (B) ensures to adjust the viscosity of the water-soluble auxiliary component (B) in kneading with the resin component (A).

($B_2$) Plasticizing Component

The plasticizing component ($B_2$) should just express a phenomenon that the oligosaccharide ($B_1$) hydrates to turn into a syrup state, and may include, for example, a saccharide, and a sugar alcohol. These plasticizing components may be used singly or in combination.

(Saccharide)

As the saccharide, a monosaccharide and/or a disaccharide is usually employed for plasticizing the oligosaccharide ($B_1$) effectively. These saccharides may be used singly or in combination.

Examples of the monosaccharide include a triose, a tetrose, a pentose, a hexose, a heptose, an octose, a nonose, and a decose. These compounds may be an aldose or ketose compound, a dialdose compound (for example, a compound which is a saccharide derivative and has aldehyde groups in both ends of the carbon chain, such as tetraacetylgalactohexodialdose, ido-hexodialdose or xylo-pento-dialdose), a monosaccharide having a plurality of carbonyl groups (e.g., an aldoalko-ketose such as osone or onose), a monosaccharide having a methyl group (e.g., a methyl sugar such as altromethylose), a monosaccharide having an acyl group (in particular, e.g., a $C_{2-4}$acyl group such as acetyl group) (for example, an acetylated product of the above-mentioned aldose compound, e.g., a acetylated product such as a pentaacetylated product of an aldehyde glucose), a saccharide having an introduced carboxyl group (e.g., a saccharic acid or an uronic acid), a thiosugar, an amino sugar, a deoxy sugar, or others.

Concrete examples of such a monosaccharide include a tetrose (e.g., erythrose, and threorose), a pentose (e.g., arabinose, ribose, lyxose, deoxyribose, and xylose), and a hexose (e.g., allose, altrose, glucose, mannose, gulose, idose, galactose, fructose, sorbose, fucose, rhamnose, talose, galacturonic acid, glucuronic acid, mannuronic acid, and glucosamine).

Moreover, the monosaccharide may be a cyclic isomer having a cyclic structure formed through a hemiacetal linkage. It is not necessary that the monosaccharide has an optical activity (or rotatory polarization), and the monosaccharide may be any one of D-form, L-form, or DL-form. These monosaccharides may be used singly or in combination.

The disaccharide is not particularly limited to a specific one as far as the disaccharide can plasticize the oligosaccharide ($B_1$). For example, among the above-mentioned disaccharides, there may be exemplified a disaccharide having a low melting point or low softening point (e.g., gentiobiose, melibiose, and trehalose (dihydrate)), and a disaccharide corresponding to a homo- and heterodisaccharide of the above-mentioned monosaccharide (e.g., an aldobiouronic acid such as glucuronoglucose in which glucuronic acid binds to glucose through an $\alpha$-1,6-glycoside linkage).

The saccharide is, in terms of thermal stability, preferably a reducing sugar [for example, a free monosaccharide, and in addition, a reducing sugar having a low melting point or low softening point (e.g., gentiobiose, and melibiose) among the disaccharides].

(Sugar Alcohol)

As the sugar alcohol (or water-soluble polyhydric alcohol), a linear (or chain) sugar alcohol such as an alditol (glycitol) or a cyclic sugar alcohol such as an inositol may be used, and usually, the linear sugar alcohol may be employed. These sugar alcohols may be used singly or in combination.

Examples of the linear sugar alcohol include a tetrytol (e.g., threitol, and erythritol), a pentitol [e.g., pentaerythritol, arabitol, ribitol (adonitol), xylitol, and lyxitol], a hexitol [e.g., sorbitol, mannitol, iditol, gulitol, talitol, dulcitol (galactitol), allo-dulcitol (allitol), and altritol], a heptitol, an octitol, a nonitol, a decitol, and a dodecitol.

Among these sugar alcohols, the preferred sugar alcohol includes erythritol, pentaerythritol, arabitol, ribitol, xylitol, sorbitol, dulcitol and mannitol. The sugar alcohol often comprises at least one sugar alcohol selected from the group consisting of erythritol, pentaerythritol and xylitol.

The plasticizing component ($B_2$) may be a liquid (or in a syrup state) at room temperatures (e.g., about 15 to 20° C.), and from the viewpoint of handleability and others, the plasticizing component ($B_2$) is usually a solid in many cases. In the case where the auxiliary component (B) comprises the oligosaccharide ($B_1$) and the plasticizing component ($B_2$), the plasticizing component ($B_2$) can plasticize or soften the oligosaccharide ($B_1$) effectively even when the oligosaccharide ($B_1$) is a thermally decomposable oligosaccharide not having a clear melting point or softening point.

The melting point or softening point of the plasticizing component ($B_2$) is usually not more higher than the heat distortion temperature of the resin component (A) (e.g., a Vicat softening point defined by JIS K 7206). Incidentally, some plasticizing components are molten at a temperature lower than the actual melting point while having a high melting point (e.g., a melting point of not lower than 200° C.) when coexisting with the oligosaccharide. For example, pentaerythritol exerts a plasticizing effect on the oligosaccharide and melts at a temperature (e.g., at about 160 to 180° C.) lower than the actual melting point (260° C.). The plasticizing component having such a high melting point cannot be utilized on its own because of being not molten at the heat distortion temperature of the resin component. However, such a plasticizing component can be utilized effectively in combination with the oligosaccharide. Incidentally, in the plasticizing component exerting a plasticizing effect on the oligosaccharide (e.g., pentaerythritol) at a temperature lower than the actual melting point, the temperature at which a plasticizing effect on the oligosaccharide is exerted may be regarded as the "melting point or softening point" of the plasticizing component ($B_2$).

The melting point or softening point of the auxiliary component (B) may be not higher or lower than the heat distortion temperature of the resin component (A). It is sufficient that the resin component (A) and the auxiliary component (B) are molten or soften at a temperature of at least a kneading temperature (or fabrication temperature). For example, the temperature difference between the melting point or softening point of the auxiliary component (B) and the heat distortion temperature of the resin component (A) may be selected from the range of 0 to 100° C. For example, the temperature difference may be about 3 to 80° C. (e.g., about 3 to 55° C.), preferably about 5 to 60° C. (e.g., about 5 to 45° C.), and more preferably about 5 to 40° C. (e.g., about 10 to 35° C.). Incidentally, in the case where the temperature difference between the melting point or softening point of the auxiliary component (B) and the heat distortion temperature of the resin component (A) is small (e.g., in the case where the temperature difference is about 0 to 20° C.), there is an advantage that the dispersion shape can be fixed in a short time by an auxiliary component (B) having a high solidification rate (e.g., a sugar component).

Further, the melt flow rate of the auxiliary component (B) (e.g., an auxiliary component comprising the oligosaccharide ($B_1$) and the plasticizing component ($B_2$)) may be, for example, when measured is the melt flow rate defined by JIS K 7210 at a temperature 30° C. higher than the heat distortion temperature of the resin component (A) (e.g., the Vicat softening point), not less than 1 (e.g., about 1 to 40), preferably not less than 5 (e.g., about 5 to 30), and more preferably not less than 10 (e.g., about 10 to 20).

In the auxiliary component (B), the ratio (weight ratio) of the plasticizing component ($B_2$) is selected from the range that the plasticizing component can plasticize the oligosaccharide ($B_1$) efficiently without localizing by aggregation or other reason accompanying melt-kneading. For example, the ratio of the oligosaccharide ($B_1$) relative to the plasticizing component ($B_2$) [the oligosaccharide ($B_1$)/the plasticizing component ($B_2$)] may be selected from 99/1 to 50/50, and may be preferably about 95/5 to 60/40 and more preferably about 90/10 to 70/30.

The compatibility between the resin component (A) and the auxiliary component (B) is not particularly limited to a specific one. The resin component (A) and the auxiliary component (B) may be incompatible or compatible with each other. In the case where the resin component and the auxiliary component are compatible with each other, the resin component and the auxiliary component can be phase-separated from each other due to differences in surface tension and solidification rate between the resin component and the auxiliary component in a cooling process after kneading even when the resin component and the auxiliary component forms a uniform and single phase at a kneading temperature. The resin component and the auxiliary component can be phase-separated from each other even in the case of having compatibility because the auxiliary component of the present invention has a low surface tension and can maintain a relatively high viscosity even at a temperature for kneading with the resin component, and in addition has a unique property that is extremely high solidification rate on cooling compared with the resin component because of low in the molecular weight.

The ratio (weight ratio) of the resin component (A) relative to the auxiliary component (B) may be selected depending on the kinds or viscosities of the resin component and the auxiliary component, the compatibility between the resin component and the auxiliary component, or other factor(s), and is not particularly limited to a specific one. The ratio [the resin component (A)/the auxiliary component (B)] may be usually selected from the range that formability of the dispersed composition is not impaired, for example, a broad range such as about 99/1 to 1/99. For example, the ratio is about 90/10 to 5/95, preferably about 80/20 to 10/90 (e.g., about 80/20 to 15/85), and more preferably 75/25 to 25/75 (in particular, about 60/40 to 25/75).

Incidentally, in the case where a shaped article (resinous shaped article) obtained from the dispersed composition is a porous one, the ratio (weight ratio) of the resin component (A) relative to the auxiliary component (B) [the resin component (A)/the auxiliary component (B)] may be selected from the range of 75/25 to 10/90. For example, in view of keeping a balance between porosity and mechanical strength, the ratio is preferably about 60/40 to 15/85 (e.g., about 50/50 to 15/85), and more preferably about 40/60 to 25/75. For example, when the ratio [(A)/(B)] (weight ratio) is about 40/60 to 25/75, the porous resinous shaped article is useful as a separation membrane.

Moreover, in the case where a shaped article (resinous shaped article) obtained from the dispersed composition is a particulate, the ratio (weight ratio) of the resin component (A) relative to the auxiliary component (B) [the resin component (A)/the auxiliary component (B)] is usually about 55/45 to 1/99, preferably about 50/50 to 5/95, and more preferably about 45/55 to 10/90.

[Other Additive]

The dispersed composition or the resin composition may comprise, if necessary, various additives, for example, a filler, a plasticizer or a softener, a lubricant, a stabilizer (e.g., a heat stabilizer, an antioxidant, and an ultraviolet ray absorbing agent), a thickener, a coloring agent (e.g., a titanium oxide, and a carbon black), a dispersing agent, a flame retardant, and a antistatic agent.

The filler (or reinforcer) includes, for example, a particulate filler or reinforcer (e.g., a mica, a clay, a talc, a silicate compound, a silica, calcium carbonate, magnesium carbonate, a carbon black, and a ferrite), and a fibrous filler or reinforcer (e.g., an organic fiber such as a rayon, a nylon, a vinylon or an aramid, and an inorganic fiber such as a carbon fiber, a glass fiber, a metal fiber or a whisker).

In these additives, the amount of each additive may be an effective amount, and for example, the total amount of the additives may be about 0 to 50 parts by weight, preferably about 0.1 to 20 parts by weight and more preferably about 0.5 to 10 parts by weight, relative to 100 parts by weight of the resin. Moreover, relative to 100 parts by weight of the resin, the amount of each additive may be about 0 to 30 parts by weight, preferably about 0.05 to 20 parts by weight, and more preferably about 0.1 to 10 parts by weight.

In the dispersed composition or the resin composition of the present invention, the phase separation structure or the dispersion structure is not particularly limited to a specific one, and the resin component and the auxiliary component may form an islands-in-the-sea structure or a complex structure of the dispersed phase, or the both components may form a continuous phase, respectively. In the case where the auxiliary component (B) forms a continuous phase in an islands-in-the-sea structure (a phase separation structure having an independent resin phase) or in a bicontinuous phase, the auxiliary component can be eluted quickly.

In the case where the auxiliary component (B) forms the continuous phase in an islands-in-the-sea structure, the conformation (or shape) of the dispersed phase comprising the resin component may be a particle shape (e.g., a spherical shape, an elliptical shape, a polyhedral shape, a prismatic shape, a columnar (or cylindrical) shape, a rod-like shape, and an amorphous shape), and others. The preferred shape of the dispersed phase is a spherical shape. Incidentally, the average particle size of the dispersed phase is not particularly limited to a specific one, and may be selected from the range of about 0.1 μm to 1 mm as usage. For example, the average particle size is about 0.1 to 800 μm (e.g., about 0.1 to 500 μm), preferably about 0.1 to 100 μm (e.g., about 0.5 to 80 μm), and more preferably about 0.5 to 50 μm (e.g., about 1 to 40 μm).

When the auxiliary component (B) and the resin component (A) form a bicontinuous phase, the conformation (or shape) of a continuous phase comprising the auxiliary component (pore-forming agent) may be a lamellar structure, an OBDD (Ordered Bicontinuous Double Diamond) structure, a cylinder structure, and others. In the case of measuring the size of the continuous phase having such a structure, a conventional measuring method such as a conversion into the size of a circle cannot be used due to absence of an independent unit (such as a particle unit). In such a case, the size of the continuous phase comprising the auxiliary component can be determined, for example, by measuring the minimum length (X) in the width direction of the phase in one continuous phase (or tetrapod-shaped base unit) for one cross section of the dispersed composition. Further, by measuring the length (X) in each of a plurality of the phases (or base units) selected at random, the average value of the length (X) can be calculated. The average length (X) is not particularly limited to a specific one, and may be selected from the range of about 0.1 μm to 1 mm as usage. For example, the average length (X) is about 0.1 to 800 μm (e.g., about 0.1 to 500 μm), preferably about 0.1 to 100 μm (e.g., about 0.5 to 80 μm), and more preferably about 0.5 to 50 μm (e.g., about 1 to 40 μm).

[Production Process of Shaped Article]

The present invention also includes a process comprising eluting the auxiliary component (B) from the dispersed composition for producing a shaped article (e.g., a porous material, or a particle) comprising a resin component (A).

The dispersed composition may be prepared by kneading the resin component (A) with auxiliary component (B), and usually, the kneaded composition is often shaped to prepare a preliminary shaped article. The kneading operation may be carried out by using a conventional kneading machine (e.g., a uniaxial or biaxial screw extruder, a kneader, and a calender roll). The kneading time may be, for example, selected from the range of 10 seconds to one hour, and is usually about 30 seconds to 45 minutes, and preferably about 1 to 30 minutes (e.g., 1 to 10 minutes). Moreover, in advance of kneading, the resin component and the auxiliary component may be preliminarily converted into a powder form by a machine such as a freeze grinder or may be preliminarily kneaded by a Henschel mixer, a tumbler mixer, a ball mill or others.

Examples of the shaping (or molding) method include an extrusion molding, an injection molding, a blow molding, and a calender molding. In view of productivity or easiness of processing, an extrusion molding or an injection molding is usually applied. The shape of the preliminary shaped article is not particularly limited to a specific one, and may be a zero-dimensional shape (e.g., a particle shape, and a pellet shape), a one-dimensional shape (e.g., a strand shape, and a rod or bar shape), a two-dimensional shape (e.g., a plate shape, a sheet shape, and a film shape), a three-dimensional shape (e.g., a tubular shape, and a block shape), and others. Considering the elution property (or elution capability) of the auxiliary component, it is desirable to process (or shape) the dispersed composition into a strand shape, a rod or bar shape, a sheet shape, or a film shape. Moreover, the preliminary shaped article may be processed by laminating other base material in the shaping (or molding) process.

Incidentally, it is possible to set the kneading temperature or processing (shaping) temperature (or fabrication temperature) appropriately depending on a raw material to be used (e.g., the resin component and the auxiliary component). For example, the kneading temperature or processing temperature is about 90 to 300° C., preferably about 110 to 260° C., more preferably about 140 to 240° C. (e.g., about 170 to 240° C.), and particularly about 170 to 230° C. (e.g., about 180 to 220° C.). In order to avoid thermal decomposition of the auxiliary component (the oligosaccharide and the plasticizing component), the kneading temperature or the processing temperature may be set to a temperature not higher than 230° C.

The disperse system (a form in which the resin component and the auxiliary component are dispersed) may be formed by cooling a molten mixture (e.g., a kneaded matter, and a preliminary shaped article) of the resin component and the auxiliary component appropriately after kneading and/or processing (shaping or fabrication). For example, the cooling temperature may be at least about 10° C. lower than the heat distortion temperature of the resin component, or the melting point or softening point of the auxiliary component, and e.g., may be about 10 to 100° C. lower than the above temperature (the heat distortion temperature of the resin component, or the melting point or softening point of the auxiliary component), preferably about 15 to 80° C. lower than the above temperature, and more preferably about 20 to 60° C. lower than the above temperature. Specifically, for example, the cooling temperature may be selected from the range of 5 to 150° C. depending on the kind of the resin component or the auxiliary component, and may be, e.g., about 10 to 120° C. (e.g., about 10 to 60° C.), preferably about 15 to 100° C. (e.g., about 15 to 50° C.), and more preferably about 20 to 80° C. (e.g., about 20 to 40° C.). The cooling time may be suitably set according to the kind of the resin component or the auxiliary component, the cooling temperature, and others, and may be selected, for example, from the broad range of 30 seconds to 20 hours. For example, the cooling time may be about 45 seconds to 10 hours, preferably about one minute to 5 hours (e.g., about one minute to one hour), and more preferably about 1.5 to 30 minutes. Even in the case where the resin component and the auxiliary component are compatible with each other, the disperse system can be formed by cooling due to differences in surface tension and solidification (such as crystallization) rate between the resin component and the auxiliary component in the cooling step, and a dispersed composition can be obtained.

For example, in the case of producing a porous material or a particle, the average pore size of the porous material or the average particle size of the particle may be changed by adjusting the compatibility between the resin component and the auxiliary component, the melt viscosity of the resin component and the auxiliary component, the kneading conditions (e.g., the kneading time, and the kneading temperature), the processing (or shaping) temperature, and the cooling conditions (e.g., the cooling time, and the cooling temperature), so that a porous material having not only a high porosity but also a very high uniformity in pore size (in particular, a porous material having an open pore (or cell)), or a particle having a narrow particle size distribution range and a uniform particle size can be obtained conveniently. Moreover, the form of the object matter can be changed by adjusting the above-mentioned conditions (e.g., the viscosity, and the cooling conditions). For example, even a system having a determined formulation in the resin component and the auxiliary component may selectively form a porous material or a particle depending on these conditions.

The average pore size of the porous material or the average particle size of the particle may be selected from the range of about 0.1 μm to 1 mm as usage without being limited to a specific one, and is, for example, about 0.1 to 800 μm (e.g., about 0.1 to 500 μm), preferably about 0.1 to 100 μm (e.g., about 0.5 to 80 μm), and more preferably about 0.5 to 50 μm (e.g., about 1 to 40 μm).

Moreover, the coefficient of variation of the pore size ([the standard deviation of the pore size/the average pore size]× 100) or the coefficient of variation of the particle size ([the standard deviation of the particle size/the average particle size]×100) is not more than 60 (e.g., about 5 to 60), and more preferably not more than 50 (e.g., about 10 to 50).

The preliminary shaped article (or dispersed composition) obtained by the above-mentioned manner may be immersed in a solvent [for example, water, a water-soluble solvent (e.g., an alcohol compound (such as methanol, ethanol, propanol, isopropanol, or butanol), and an ether compound (such as a cellosolve or a butyl cellosolve))] to elute or wash out the auxiliary component, and a shaped article may be obtained accordingly. The preferred solvent is water because of the low burden on the environment and the industrial cost reduction. The elution of the auxiliary component may be conducted by a conventional manner, for example under an atmospheric pressure (e.g., about one atom or 100,000 Pa), a reduced pressure, or an elevated pressure. The elution temperature of the auxiliary component may be appropriately set depending on the resin component and the auxiliary component, and is, for example, about 10 to 100° C., preferably about 25 to 90° C., and more preferably 30 to 80° C. (e.g., about 40 to 80° C.). Since the water-soluble auxiliary component of the present invention is easily soluble in water, a large amount of water is not required.

The shaped article may be collected by a collecting method such as filtration or centrifugation. It is desirable that the obtained shaped article has no residual auxiliary component. However, the small amount of the residual auxiliary component in the shaped article does not significantly affect the shaped article because the auxiliary component is a compound derived from a natural product, in view of cost reduction of the washing process.

Incidentally, the auxiliary component extracted with the solvent may be conveniently collected by a conventional separating means (e.g., distillation, concentration, and recrystallization).

The above-mentioned shaped article is not particularly limited to a specific one as far as the shaped article is obtained by eluting the auxiliary component from the resin component, and for example, includes a porous material (e.g., a porous material having a two-dimensional structure such as a sheet shape or a film shape) or a particle (e.g., a particle having a spherical (or round or ball-like) shape or a fine spherical shape). Incidentally, the obtained shaped article may be processed by laminating other base material by a thermal fusing or other means.

According to the present invention, the use of a water-soluble auxiliary component (or a water-soluble auxiliary agent) being a saccharide yet kneadable with a resin uniformly ensures to produce a dispersed composition comprising the water-soluble auxiliary component and the resin component (or a resin composition for forming a disperse system). Moreover, even in the case of using a wide kind of the resin component, the present invention ensures not only to form a shaped article having a given shape with industrial advantage, but also to form a dispersed composition kneadable even in containing an auxiliary component in a high proportion relative to a resin component and having a uniform phase-separation structure. Further, the water-soluble auxiliary component can be eluted from the dispersed composition with water, and additionally, even in the case of discarding the eluted liquid eluate as a waste fluid, the water-soluble auxiliary component has no adverse affect on the environment because of being derived from a natural product.

INDUSTRIAL APPLICABILITY

The shaped article obtained by the production process of the present invention may be used for various applications depending on the given shape. For example, the porous material may be utilized for a separation membrane for liquid, a filter, a moisture absorbent, an adsorbent, a humectant, or an image-receiving layer (or image-receiver) for recording sheet (e.g., a receiver for an image of ink).

Moreover, with respect to the particle obtained by the present invention, since the wide-ranging kind of resin can be applied for the particle, the present invention can be used for improving the easiness of a particle to be mixed with other fine particle (e.g., an inorganic fine particle). In addition, the particle may be used as a coating material or a coating agent (e.g., a powdered paint), a blocking inhibitor (e.g., a blocking inhibitor for a shaped article), a spacer, a toner, and others. Further, the particle may be also used as an additive for daily commodity (such as a cosmetic preparation), an additive for sheet or film, and others.

EXAMPLES

The following examples are intended to describe this invention in further detail and should by no means be interpreted as defining the scope of the invention.

Examples 1 to 5 and Comparative Examples 1 to 3

In each Examples or Comparative Examples, a resin composition comprising a resin component and an auxiliary component in formulation shown in Table 1 was melt-kneaded at a preset temperature of 200° C. for 5 minutes by using a brabender (manufactured by Toyo Seiki Seisaku-sho, Ltd., laboplastmill), and then was allowed to stand at 30° C. for 10 minutes. Thereafter, the kneaded matter was pressed at 200° C. for 3 minutes under a pressure of 200 kg/cm$^2$ (about 20 MPa) by using a pressing machine to produce a plate-like dispersed composition having a thickness of 1 mm. The dispersed composition was quickly cooled at 30° C. for 3 minutes under a pressure of 200 kg/cm$^2$ (about 20 MPa), and then immersed in hot water of 60° C. The dispersed composition was allowed to stand until the content of the auxiliary component was reduced to about 5% by weight of the initial content, and a porous material was finally produced. Incidentally, each component used and evaluation methods of the obtained porous material are described below. The results are shown in Table 1.

(Resin Component)

Resin-1: Ethylene-vinyl alcohol copolymer resin (manufactured by Kuraray Co., Ltd., "EP-L101B", ethylene content: 19.8% by weight)

Resin-2: Polystyrene resin (manufactured by Toyo Styrene Co., Ltd., "GPPS HRM63C")

Resin-3: Polypropylene resin (manufactured by Grand Polymer Co., Ltd., "F219D")

(Auxiliary Component)

Auxiliary component-1 (oligosaccharide): Starch sugar (manufactured by Towa Chemical Industry Co., Ltd., a reduced starch-saccharified "PO-10", a viscosity of a 50% by weight aqueous solution measured at 25° C. by a B-type viscometer: 6.5 Pa·s)

Auxiliary component-2 (plasticizing component): Sugar alcohol (manufactured by Wako Pure Chemical Industries, Ltd., pentaerythritol)

Auxiliary component-3 (plasticizing component): Sugar alcohol (manufactured by Mitsubishi-Kagaku Foods Corporation, erythritol)

(Measurement Method of Pore Size)

FIG. 1 shows a SEM photograph of cross section of a porous material obtained in Example 2. As shown in FIG. 1, in the case where the cross sectional structure of the porous material is a pore structure having a three-dimensional continuity of the pores, there is no closed pore and accordingly a conventional pore-size measuring method such as a conversion into the size of a circle cannot be adopted. Therefore, in an area corresponding to one pore in a photograph of the cross section of the porous material taken at 100 to 10000 magnifications by a scanning electron microscope (SEM: manufactured by JEOL Ltd.), the minimum length in the width direction of the pore was considered as a pore size. In the obtained pore material, 100 pores were selected at random and respective pore sizes were measured to calculate the average pore size, the standard deviation, and the coefficient of variation. Further, the presence or absence of a pore having a pore size over 100 μm was inspected.

TABLE 1

|  |  | Examples |  |  |  |  | Comparative Examples |  |  |
|---|---|---|---|---|---|---|---|---|---|
|  |  | 1 | 2 | 3 | 4 | 5 | 1 | 2 | 3 |
| Resin component (% by weight) | 1 | 30 | 30 | 30 | — | — | 30 | 30 | — |
|  | 2 | — | — | — | 30 | — | — | — | 30 |
|  | 3 | — | — | — | — | 30 | — | — | — |
| Auxiliary component (% by weight) | 1 | 70 | 50 | 49 | 50 | 50 | — | — | — |
|  | 2 | — | 20 | 19 | 20 | 20 | 70 | 50 | 70 |
|  | 3 | — | — | 2 | — | — | — | 20 | — |
| Average pore size (μm) |  | 2 | 12 | 28 | 22 | 24 | 48 | — | 96 |

TABLE 1-continued

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Standard deviation (μm) | 0.8 | 4.7 | 9.8 | 10.7 | 11.4 | 42 | — | 120 |
| Coefficient of variation | 40 | 39 | 35 | 49 | 48 | 88 | — | 125 |
| Pore having pore size over 100 μm | none | none | none | none | none | present | — | present |

As apparent from Table 1, in each of Examples 1 to 5, a porous material having a coefficient of variation of not more than 60 and a high uniformity in pore size was obtained.

In Comparative Examples 1 and 3, the presence of aggregated massive pentaerythritol was visually confirmed apparently in the resinous shaped article after melt-kneading, and pores having a pore size over 100 μm were scattered over the obtained porous material. Moreover, in Comparative Example 2, erythritol molten during the melt-kneading step was separated from the resin component completely. Therefore, it was impossible to obtain a uniform mixing state and give a porous material.

Examples 6 to 19 and Comparative Examples 4 and 5

A dispersed composition was produced from a resin component and an auxiliary component having a formulation shown in Table 2 in the same manner as in Example 1. The obtained dispersed composition was quickly cooled at 30° C. for 3 minutes under a pressure of 200 kg/cm$^2$ (about 20 MPa), and then immersed in hot water of 60° C. to give a suspension of a resin particle. The insoluble matter was separated from the suspension by using a membrane (pore size: 0.45 μm) made of a polyvinylidene fluoride to collect the fine particle of the resin. Incidentally, each component used, compatibility, and evaluation methods of the obtained porous material are described below. The results are shown in Table 2.

(Resin Component)

Resin-4: Nylon 12 (polyamide 12) resin (manufactured by Daicel-Degussa Ltd., "DIAMID L1600")

Resin-5: Polystyrene resin (manufactured by Toyo Styrene Co., Ltd., "GPPS HRM63C")

Resin-6: Cellulose acetate butyrate resin (manufactured by Eastman Chemical Company, "CAB171-15S")

Resin-7: Styrene-butadiene copolymer resin (manufactured by Phillips Petroleum International Ltd., "K RESIN KK38")

Resin-8: Polyvinylidene fluoride resin (manufactured by Solvay Advanced Polymers K.K., "PVDF6008")

Resin-9: Polylactic acid (manufactured by Mitsui Chemicals, Inc., "LACEA H-100PL")

Resin-10: Polycaprolactone-polybutylene succinate copolymer resin (manufactured by Daicel Chemical Industries, Ltd., "CELLGREEN CBS201")

Resin-11: Ethylene-vinyl alcohol copolymer resin (manufactured by Kuraray Co., Ltd., "EP-L101B", ethylene content: 19.8% by weight)

(Auxiliary Component)

Auxiliary component-4 (oligosaccharide): Starch sugar (manufactured by Towa Chemical Industry Co., Ltd., a reduced starch-saccharified "PO-10", a viscosity of a 50% by weight aqueous solution measured at 25° C. by a B-type viscometer: 6.5 Pa·s)

Auxiliary component-5 (a) (plasticizing component): Sugar alcohol (manufactured by Wako Pure Chemical Industries, Ltd., pentaerythritol)

Auxiliary component-5 (b) (plasticizing component): Sugar alcohol (manufactured by Wako Pure Chemical Industries, Ltd., D(−)sorbitol)

(Evaluation of Compatibility Between Resin Component and Auxiliary Component)

In order to evaluate whether or not the resin component and the auxiliary component were compatible with each other at the kneading temperature, a thermal analysis by a differential scanning calorimetry (DSC) was used. The method is detailed below.

As a measuring apparatus, a differential scanning calorimeter (DSC: manufactured by Shimadzu Corporation, "DSC600E") was used. A resin component and an auxiliary component having a mixing ratio shown in Table 2 were pre-kneaded at a kneading temperature (200° C.) for 5 minutes by using a brabender (manufactured by Toyo Seiki Seisaku-sho, Ltd., laboplastmill) to give a sample. The sample was subjected to the measuring apparatus, and once heated to 200° C., allowed to stand for 5 minutes. Then, based on JIS K7121, a temperature at the peak top of the exothermic peak upon crystallization of the resin component obtained at a cooling rate of 10° C./minute was read to determine a crystallization temperature of the resin component. Moreover, the same operation was conducted to the resin component, and the crystallization temperature of the resin component alone was determined.

In a crystalline resin component, when the crystallization temperature of the resin component alone was compared with that of the resin component determined by using the mixture of the resin component and the auxiliary component and the temperature difference was not more than 1° C., it was judged that the resin component and the auxiliary component had compatibility with each other.

In the case where the resin component was an amorphous resin, it was impossible to measure the crystallization temperature of the resin component. Therefore, the crystallization temperature of the oligosaccharide determined by the above-mentioned manner for the auxiliary component was compared with the crystallization temperature of the oligosaccharide determined for a mixture of the resin component and the auxiliary component. The temperature difference of the resin component and the auxiliary component was not more than 1° C., it was judged that the resin component and the auxiliary component had compatibility with each other.

(Number Average Particle Size of Resin Particle)

The collected resinous fine particle was dried, and then the configuration (or shape) of the fine particle was observed by using a scanning electron microscope. Moreover, the appropriate amount of the dry resin fine particle was dispersed in pure water again to prepare a suspension. Then, the number average particle size of the resinous fine particle was determined by using a laser diffraction particle size analyzer (manufactured by Shimadzu Corporation, "SALD-2000J"). Moreover, concerning the resinous fine particle, the standard deviation and the coefficient of variation relative to 100 particles selected at random were calculated.

(Effect on Environment)

The effect on environment was evaluated on the basis of the following criteria.

"A": auxiliary component comprises only a compound derived from a natural product.

"B": the auxiliary component comprises a compound derived from a natural product and an industrial product having a low molecular weight.

TABLE 2

| Examples | Resin component (wt %) | Auxiliary component 4 (wt %) | Auxiliary component 5 (wt %) | Compatibility | Number average particle size (μm) | Coefficient of variation | Effect on environment |
|---|---|---|---|---|---|---|---|
| Example 6 | 4 (30%) | 50% | a (20%) | compatible | 11 | 47 | B |
| Example 7 | 4 (40%) | 48% | a (12%) | compatible | 6.2 | 38 | B |
| Example 8 | 4 (30%) | 50% | b (20%) | compatible | 28 | 58 | A |
| Example 9 | 4 (20%) | 60% | b (20%) | compatible | 7.6 | 41 | A |
| Example 10 | 5 (30%) | 50% | a (20%) | incompatible | 34 | 53 | B |
| Example 11 | 5 (30%) | 50% | b (20%) | incompatible | 48 | 58 | A |
| Example 12 | 5 (30%) | 55% | b (15%) | incompatible | 12 | 45 | A |
| Example 13 | 6 (30%) | 50% | a (20%) | incompatible | 5.8 | 29 | B |
| Example 14 | 7 (30%) | 50% | a (20%) | incompatible | 18 | 47 | B |
| Example 15 | 8 (30%) | 50% | a (20%) | incompatible | 56 | 55 | B |
| Example 16 | 9 (30%) | 50% | a (20%) | incompatible | 3.3 | 28 | B |
| Example 17 | 10 (30%) | 50% | a (20%) | incompatible | 8.2 | 32 | B |
| Example 18 | 10 (30%) | 50% | b (20%) | incompatible | 24 | 34 | A |
| Example 19 | 11 (15%) | 65% | b (20%) | compatible | 22 | 33 | A |
| Comparative Example 4 | 5 (30%) | — | a (70%) | incompatible | — | — | B |
| Comparative Example 5 | 4 (30%) | — | b (70%) | compatible | — | — | A |

Auxiliary component 5: (a: pentaerythritol, b: D(−)sorbitol)

Figure 2:
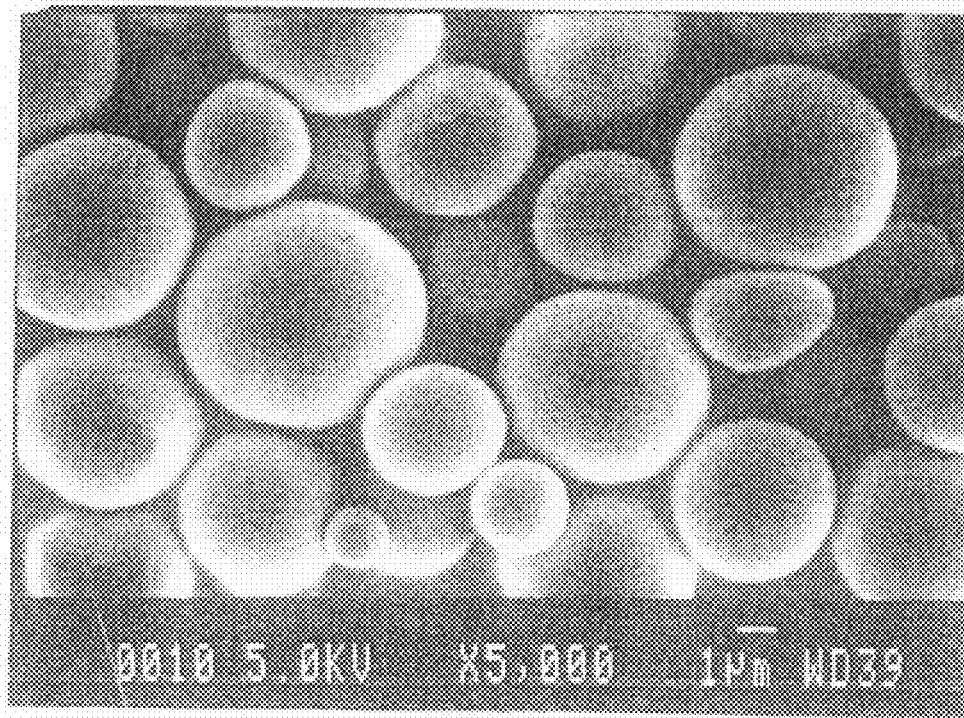
FIG. 2 is a scanning electron micrograph of particles obtained in Example 13.

In Examples 6 to 19, whether the resin component and the auxiliary component were compatible or incompatible with each other, a spherical resinous fine particle having a fine spherical shape could be obtained. For the purpose of reference, FIG. 2 shows an electron micrograph of a spherical fine particle of a cellulose acetate butyrate resin obtained in Example 13.

Moreover, in Comparative Example 4 using pentaerythritol, as an auxiliary component, which was a sugar alcohol not plasticized completely at the heat distortion temperature of the resin component, even when the dispersed composition obtained by melt-kneading was immersed in water to remove the auxiliary component, the resin component was not made into a fine particle and a sponge-like massive product possessing a pore having a pore size over 100 μm was obtained.

Further, in Comparative Example 5 using sorbitol, as an auxiliary component, which was a sugar alcohol having a melting point lower than the heat distortion temperature of the resin component, it was impossible to knead the auxiliary component with the resin component because of a too low viscosity of the auxiliary component in melt-kneading.

The invention claimed is:

1. A process for producing particles comprising a resin component (A), the process comprising:

kneading the resin component (A) comprising a thermoplastic resin with an auxiliary component (B) comprising at least
        an oligosaccharide ($B_1$) and
        a water-soluble plasticizing component ($B_2$) for plasticizing the oligosaccharide ($B_1$) wherein the water-soluble plasticizing component ($B_2$) is at least one member selected from the group consisting of a monosaccharide, a disaccharide and a sugar alcohol, to provide a dispersed composition, wherein the dispersed composition comprises a continuous phase comprising the auxiliary component (B) and a dispersed phase as the particles comprising the resin component (A), and the dispersed composition has an islands-in-the-sea structure, and eluting an auxiliary component (B) from the dispersed composition, wherein the average particle size of the particles is 0.1 to 100 μm, and the coefficient of variation of the particle size is not greater than 60.

2. The process according to claim 1, wherein the resin component (A) comprises at least one member selected from the group consisting of a polyester-series resin, a polyamide-series resin, a polyurethane-series resin, a poly(thio)ether-series resin, a polycarbonate-series resin, a polysulfone-series resin, a polyolefinic resin, a (meth)acrylic resin, a styrenic resin, a vinyl-series resin, a cellulose derivative, and a thermoplastic elastomer.

3. The process according to claim 1, wherein the oligosaccharide ($B_1$) has a melting point or a softening point at a temperature higher than a heat distortion temperature of the resin component (A), or is decomposed at a temperature higher than the heat distortion temperature of the resin component (A).

4. The process according to claim 1, wherein the oligosaccharide ($B_1$) comprises at least one member selected from the group consisting of a starch sugar, a galactooligosaccharide, a coupling sugar, a fructooligosaccharide, a xylooligosaccharide, a soybean oligosaccharide, a chitin oligosaccharide and a chitosan oligosaccharide.

5. The process according to claim 1, wherein the viscosity of the 50% by weight aqueous solution of the oligosaccharide ($B_1$) is not less than 1 Pa·s as measured at a temperature of 25° C. by a B-type viscometer.

6. The process according to claim 1, wherein the melting point or softening point of the plasticizing component ($B_2$) is not higher than the heat distortion temperature of the resin component (A).

7. The process according to claim 1, wherein the monosaccharide comprises at least one member selected from the group consisting of a triose, a tetrose, a pentose, a hexose, a heptose, a octose, a nonose, a decose and a dodecose, and the disaccharide comprises at least one member selected from the group consisting of a homodisaccharide of one of said monosaccharides and a heterodisaccharide of two of said monosaccharides.

8. The process according to claim 1, wherein the sugar alcohol comprises at least one member selected from the group consisting of a tetrytol, a pentitol, a hexitol, a heptitol, an octitol, a nonitol, a decitol and a dodecitol.

9. The process according to claim 1, wherein the sugar alcohol comprises at least one member selected from the group consisting of erythritol, pentaerythritol, arabitol, ribitol, xylitol, sorbitol, dulcitol and mannitol.

10. The process according to claim 1, wherein the resin component (A) has a Vicat softening point defined by JIS K 7206 of 60 to 300° C.; the viscosity of the 50% by weight aqueous solution of the oligosaccharide ($B_1$) is 3 to 100 Pa·s as measured at a temperature of 25° C. by a B-type viscometer; a melt flow rate defined by JIS K 7210 of the auxiliary component (B) comprising the oligosaccharide ($B_1$) and the plasticizing component ($B_2$) is not less than 1 as measured at a temperature 30° C. higher than said Vicat softening point.

11. The process according to claim 1, wherein the ratio (weight ratio) of the resin component (A) relative to the auxiliary component (B) [the resin component (A)/the auxiliary component (B)] is 99/1 to 1/99.

12. The process according to claim 1, wherein the ratio (weight ratio) of the oligosaccharide ($B_1$) relative to the plasticizing component ($B_2$) [the oligosaccharide ($B_1$)/the plasticizing component ($B_2$)] is 99/1 to 50/50.

13. The process according to claim 1, wherein the resin component (A) comprises at least one member selected from the group consisting of a polyamide-series resin, a styrenic resin, a polyolefinic resin, a vinyl alcohol-series resin, a cellulose derivative, a halogen-containing resin, an aliphatic polyester-series resin and a thermoplastic elastomer; the oligosaccharide ($B_1$) constituting the auxiliary component (B) comprises at least one member selected from the group consisting of a starch sugar, a galactooligosaccharide, a coupling sugar, a fructooligosaccharide, a xylooligosaccharide, a soybean oligosaccharide, a chitin oligosaccharide and a chitosan oligosaccharide; the plasticizing component ($B_2$) comprises at least one member selected from the group consisting of erythritol, pentaerythritol, xylitol and sorbitol; the ratio (weight ratio) of the resin component (A) relative to the auxiliary component (B) [the resin component (A)/the auxiliary component (B)] is 90/10 to 5/95; and the ratio (weight ratio) of the oligosaccharide ($B_1$) relative to the plasticizing component ($B_2$) [the oligosaccharide ($B_1$)/the plasticizing component ($B_2$)] is 95/5 to 60/40.

* * * * *